United States Patent [19]

Vail, III

[11] Patent Number: 5,043,669

[45] Date of Patent: * Aug. 27, 1991

[54] METHODS AND APPARATUS FOR MEASUREMENT OF THE RESISTIVITY OF GEOLOGICAL FORMATIONS FROM WITHIN CASED WELLS IN PRESENCE OF ACOUSTIC AND MAGNETIC ENERGY SOURCES

[75] Inventor: William B. Vail, III, Bothell, Wash.

[73] Assignee: Para Magnetic Logging, Inc., Woodinville, Wash.

[ * ] Notice: The portion of the term of this patent subsequent to Apr. 11, 2006 has been disclaimed.

[21] Appl. No.: 438,268

[22] Filed: Nov. 16, 1989

Related U.S. Application Data

[63] Continuation-in-part of Ser. No. 89,697, Aug. 26, 1987, Pat. No. 4,882,542, which is a continuation-in-part of Ser. No. 927,115, Nov. 4, 1986, Pat. No. 4,820,989.

[51] Int. Cl.$^5$ .............................................. G01V 3/26
[52] U.S. Cl. ................................................... 324/368
[58] Field of Search ................................ 324/347–375

[56] References Cited

U.S. PATENT DOCUMENTS

| | | |
|---|---|---|
| 2,729,784 | 1/1956 | Fearon . |
| 2,891,215 | 6/1959 | Fearon . |
| 4,796,186 | 1/1989 | Kaufman .......................... 324/368 X |
| 4,820,989 | 4/1989 | Vail, III .............................. 324/368 |
| 4,837,518 | 6/1989 | Gard et al. ........................... 324/368 |
| 4,882,542 | 11/1989 | Vail, III .............................. 324/368 |
| 4,901,023 | 2/1990 | Vail, III ........................... 324/368 X |

FOREIGN PATENT DOCUMENTS 56026 11/1939 U.S.S.R. .

Primary Examiner—Kenneth A. Wieder
Assistant Examiner—Warren S. Edmonds

[57] ABSTRACT

Methods and apparatus are provided for measuring the acoustically modulated electronic properties of geological formations and cement layers adjacent to cased boreholes. Current is passed from an electrode in electrical contact with the interior of the borehole casing to an electrode on the surface of the earth. Voltage measuring electrodes in electrical contact with the interior of the casing measure the voltage at various points thereon. The voltage differences between discrete pairs of the voltage measuring electrodes provide a measurement of the leakage current conducted into formation in the vicinity of those electrodes. Simultaneously subjecting the casing and formation to an acoustic source acoustically modulates the leakage current measured thereby providing a measure of the acoustically modulated electronic properties of the adjacent formation. Similarly, methods and apparatus are also described which measure the leakage current into formation while simultaneously subjecting the casing to an applied magnetic field which therefore allows measurement of the magnetically modulated electronic properties of the casing and the adjacent formation.

14 Claims, 9 Drawing Sheets

METHODS AND APPARATUS FOR MEASUREMENT OF THE RESISTIVITY OF GEOLOGICAL FORMATIONS FROM WITHIN CASED WELLS IN PRESENCE OF ACOUSTIC AND MAGNETIC ENERGY SOURCES

This invention was made with Government support under DOE Grant No. DE-FG06-84ER13294, entitled "Validating the Paramagnetic Logging Effect", awarded by the Division of Advanced Energy Projects, Office of Basic Energy Sciences, of the U.S. Department of Energy. The government has certain rights in this invention. The invention described herein was conceived during the funding provided by the above grant.

Ongoing research to measure resistivity through casing has been provided on a co-funded basis from: (a) U.S. Department of Energy (DOE) Grant No. DE-FG19-88BC14243 entitled "Proof of Feasibility of Thru Casing Resistivity Technology"; and (b) Gas Research Institute (GRI) Contract No. 5088-212-1664 entitled "Proof of Feasibility of the Through Casing Resistivity Technology". The government and the GRI have certain rights in this invention related to this recent funding.

This application is a continuation-in-part application of an earlier continuation-in-part application that is entitled "Methods and Apparatus for Measurement of Electronic Properties of Geological Formations Through Borehole Casing"; which is Ser. No. 07/089,697; which has the filing date of Aug. 26, 1987; and which issued on Nov. 21, 1989 as U.S. Pat. No. 4,882,542. A copy of Ser. No. 07/089,697 is included herein by reference.

The earlier continuation-in-part application with Ser. No. 07/089,697 is derived from the original parent application having the title "Methods and Apparatus for Measurement of the Resistivity of Geological Formations from Within Cased Boreholes"; which has Ser. No. 06/927,115; which has the filing date of Nov. 4, 1986; and which issued on Apr. 11, 1989 as U.S. Pat. No. 4,820,989. A copy of Ser. No. 06/927,115 is included herein by reference.

A portion of the invention described herein was disclosed in U.S. Disclosure Document No. 189,883 dated Apr. 1, 1988 which is entitled "Methods and Apparatus for the Measurement of the Acoustically Modulated Electronic Properties of Geological Formations Through Borehole Casing".

This invention provides for methods and apparatus for measurement of the acoustically modulated electronic properties of formations. These properties which may be acoustically modulated include the resistivities, polarization phenomena, and dielectric constants of geological formations and cement layers adjacent to cased boreholes. The terms "electronic properties of formations" and "electrochemical properties of formations" are used interchangeably herein. The skin effect of the casing may also be slightly modulated acoustically.

A completely independent and separate invention is also described herein which provides for the measurement of the electronic properties of formations while simultaneously subjecting the formation and the casing to a separate applied magnetic field. In particular, the skin effect of the casing is strongly affected by an applied magnetic field that in turn affects resistivity measurements through casing.

The oil industry has long sought to measure resistivity through casing. Such resistivity measurements, and measurement of other electrochemical phenomena, are useful for at least the following purposes: locating by-passed oil and gas; reservoir evaluation; monitoring water floods; measuring quantitative saturations; cement evaluation; permeability measurements; and measurements through a drill string attached to a drilling bit. Therefore, measurements of resistivity and other electrochemical phenomena through metallic pipes, and steel pipes in particular, are an important subject in the oil industry. Acoustically modulating or magnetically modulating such important properties are therefore also subjects of interest to the oil industry. Many U.S. patents have issued in the pertinent subclass 368 of class 324 of the United States Patent and Trademark Office which address this subject. The following presents a brief description of the particularly relevant Prior Art in the field presented in the order of descending relative importance.

U.S. Pat. No. 4,820,989 issued to the inventor and Ser. No. 07/089,697 which will issue shortly to the inventor predominantly describe apparatus to measure electronic properties from within a cased well having two pairs of voltage measurement electrodes which engage the interior of the casing, and which have a calibration means to calibrate for thickness variations and errors in placements of electrodes. Ser. No. 07/089,697 briefly describes in the specification simultaneously subjecting the formation to an acoustic energy source while measuring resistivity through casing, but no drawings were submitted explicitly showing such an acoustic energy source. Furthermore, Ser. No. 07/089,697 also briefly describes in the specification simultaneously subjecting the casing and formation to an applied magnetic field while measuring resistivity through casing, but no drawings were submitted explicitly showing such a source of magnetic field.

U.S. Pat. No. 4,796,186 which issued on Jan. 3, 1989 to Alexander A. Kaufman entitled "Conductivity Determination in a Formation Having a Cased Well" also mostly describes apparatus having two pairs of voltage measurement electrodes which engage the interior of the casing and which also have calibration means to calibrate for thickness variations in the casing and for errors in the placements of the electrodes. In general, different methods of operation are described in the Kaufman patent compared to the Vail patents cited above. However, no acoustic or magnetic modulation of formation characteristics are suggested while simultaneously measuring resistivity in the Kaufman patent.

U.S. Pat. No. 4,837,518 which issued on June 6, 1989 to Michael F. Gard, John E. Kingman, and James D. Klein, assigned to the Atlantic Richfield Company, entitled "Method and Apparatus for Measuring the Electrical Resistivity of Geologic Formations Through Metal Drill Pipe or Casing", describes multiple voltage measurement electrodes within a cased well which engage the wall of the casing, henceforth referenced as "Arco's patent". However, Arco's patent does not describe an apparatus with two pairs of adjacent voltage measurement electrodes and associated electronics which takes the voltage differential between these two pairs to directly measure electronic properties adjacent to formations. Furthermore, Arco's patent does not describe simultaneously acoustically or magnetically modulating formation characteristics while measuring resistivity from within a cased well.

USSR Patent No. 56,026, which issued on Nov. 30, 1939 to L. M. Alpin, henceforth called the "Alpin patent", which is entitled "Process of the Electrical Measurement of Well Casings", describes an apparatus which has two pairs of voltage measurement electrodes which positively engage the interior of the casing. However, the Alpin patent does not have any suitable calibration means to calibrate for thickness variations nor errors in the placements of the electrodes. Furthermore, the Alpin patent does not describe simultaneously acoustically or magnetically modulating formation characteristics while measuring resistivity from within a cased well.

U.S. Pat. No. 2,729,784, issued on Jan. 3, 1956 having the title of "Method and Apparatus for Electric Well Logging", and U.S. Pat. No. 2,891,215 issued on June 16, 1959 having the title of "Method and Apparatus for Electric Well Logging", both of which issued in the name of Robert E. Fearon, henceforth called the "Fearon patents", describe apparatus also having two pairs of voltage measurement electrodes which engage the interior of the casing. However, an attempt is made in the Fearon patents to produce a "virtual electrode" on the casing in an attempt to measure leakage current into formation which provides for methods and apparatus which are unrelated to the Kaufman and Vail patents cited above. The Fearon patents neither provide calibration means, nor do they provide methods similar to those described in either the Kaufman patent or the Vail patents, to calibrate for thickness variations and errors in the placements of the electrodes. Furthermore, the Fearon patents do not describe simultaneously acoustically or magnetically modulating formation characteristics while measuring resistivity from within a cased well.

Accordingly, an object of the invention is to provide new and practical methods and apparatus for measuring the acoustically modulated resistivity of geological formations adjacent to cased wells.

It is another object of the invention to provide new and practical methods and apparatus to measure the acoustically modulated electrochemical properties of geological formations adjacent to cased wells.

It is yet another object of the invention to provide new and practical methods and apparatus to measure the resistivity of geological formations adjacent to cased wells which are simultaneously subjected to an applied magnetic field.

And finally, it is another object of the invention to provide new and practical methods and apparatus capable of measuring electrochemical phenomena through casing which are simultaneously subjected to an applied magnetic field.

The invention herein is described in three major different portions of the specification. In the first major portion of the specification, relevant parts of the text in Ser. No. 07/089,697 are repeated which describe apparatus defined in FIGS. 1, 3, 4, and 5. In the second major portion of the specification, methods and apparatus to acoustically modulate geological properties of formations are described. In the third major portion of the specification, methods and apparatus to magnetically modulate geological properties of formations and to modulate magnetic casing properties are described.

Figure 1:
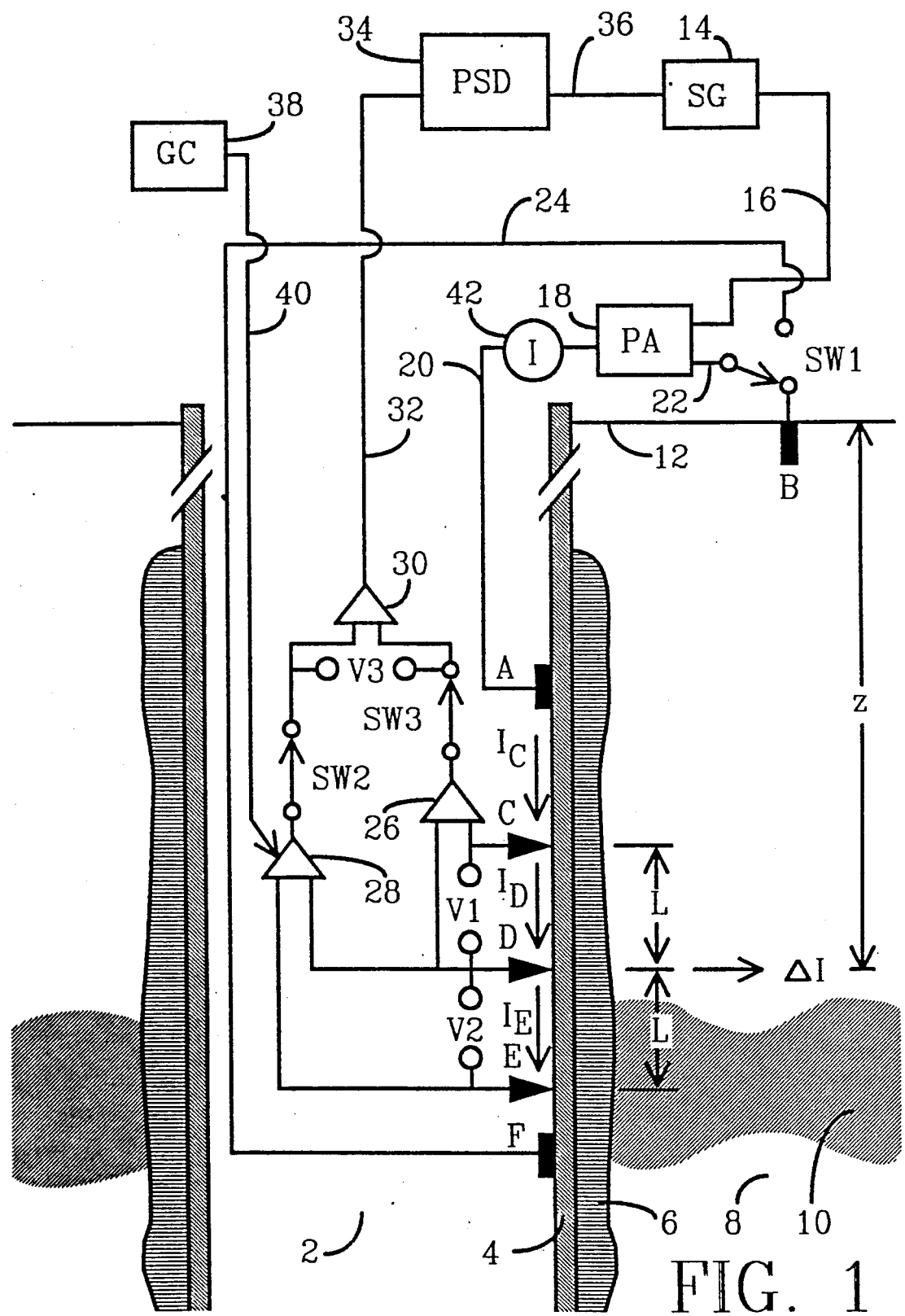
FIG. 1 is a sectional view of one preferred embodiment of the invention of the Thru Casing Resistivity Tool (TCRT).

From a technical drafting point of view, FIGS. 1, 3, 4, and 5 in Ser. No. 07/089,697 and in those contained in this application are nearly identical. However, the new drawings have been re-done using computer graphics and the A-4 International Size. The following excerpt is taken word-for-word from Ser. No. 07/089,697:

"FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The signal generator represents a generic voltage source which includes relatively simple devices such as an oscillator to relatively complex electronics such as an arbitrary waveform generator. The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

"Electrodes C, D, and E are in electrical contact with the interior of casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop V1 between electrodes C and D which is amplified differentially with amplifier 26. And the voltage difference between electrodes D and E, V2, is also amplified with amplifier 28. With switches SW2 and SW3 in their closed position as shown, the outputs of amplifiers 26 and 28 respectively are differentially substracted with amplifier 30. The voltage from amplifier 30 is sent to the surface via cable 32 to a phase sensitive detector 34. The phase sensitive detector obtains its reference signal from the signal generator via cable 36. In addition, digital gain controller 38 (GC) digitally controls the gain of amplifier 28 using cable 40 to send commands downhole. The gain controller 38 also has the capability to switch the input leads to amplifier 28 on command, thereby effectively reversing the output polarity of the signal emerging from amplifier 28 for certain types of measurements.

"The total current conducted to electrode A is measured by element 42. In the preferred embodiment shown in FIG. 1, the A.C. current used is a symmetric sine wave and therefore in the preferred embodiment, I is the O-peak value of the A.C. current conducted to electrode A. (The O-peak value of a sine wave is ½ the peak-to-peak value of the sine wave.)

"In general, with SW1 connected to electrode B, current is conducted through formation. For example, current $\Delta I$ is conducted into formation along the length 2L between electrodes C and E. However, if SW1 is connected to cable 24 and subsequently to electrode F, then no current is conducted through formation to electrode B. In this case, $I_C = I_D = I_E$ since essentially little current $\Delta I$ is conducted into formation.

"It should be noted that if SW1 is connected to electrode B then the current will tend to flow through the formation and not along the borehole casing. Calculations show that for 7 inch O.D. casing with a ½ inch wall thickness that if the formation resistivity is 1 ohm-meter and the formation is uniform, then approximately half of the current will have flowed off the casing and into the formation along a length of 320 meters of the casing. For a uniform formation with a resistivity of 10 ohm-meters, this length is 1040 meters instead."

One embodiment of the invention described in Ser. No. 07/089,697 provides a preferred method of operation for the above apparatus as follows:

"The first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages V1 and V2 are in general different because of thickness variations of the casing, inaccurate placements of the electrodes, and numerous other factors. However, the gain of amplifier 28 is adjusted using the gain controller so that the differential voltage V3 is nulled to zero. (Amplifier 28 may also have phase balancing electronics if necessary to achieve null at any given frequency of operation.) Therefore, if the electrodes are subsequently left in the same place after balancing for null, spurious effects such as thickness variations in the casing do not affect the subsequent measurements.

"With SW1 then connected to electrode B, the signal generator drives the power amplifier which conducts current to electrode A which is in electrical contact with the interior of the borehole casing. A.C. currents from 1 amps o-peak to 30 amps o-peak at a frequency of typically 1 Hz is introduced on the casing here. The low frequency operation is limited by electrochemical effects such as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing from electrode A, and some current passes through the brine saturated cement surrounding the casing and ultimately through the various resistive zones surrounding the casing. The current is then subsequently returned to the earth's surface through electrode B."

Figure 2:
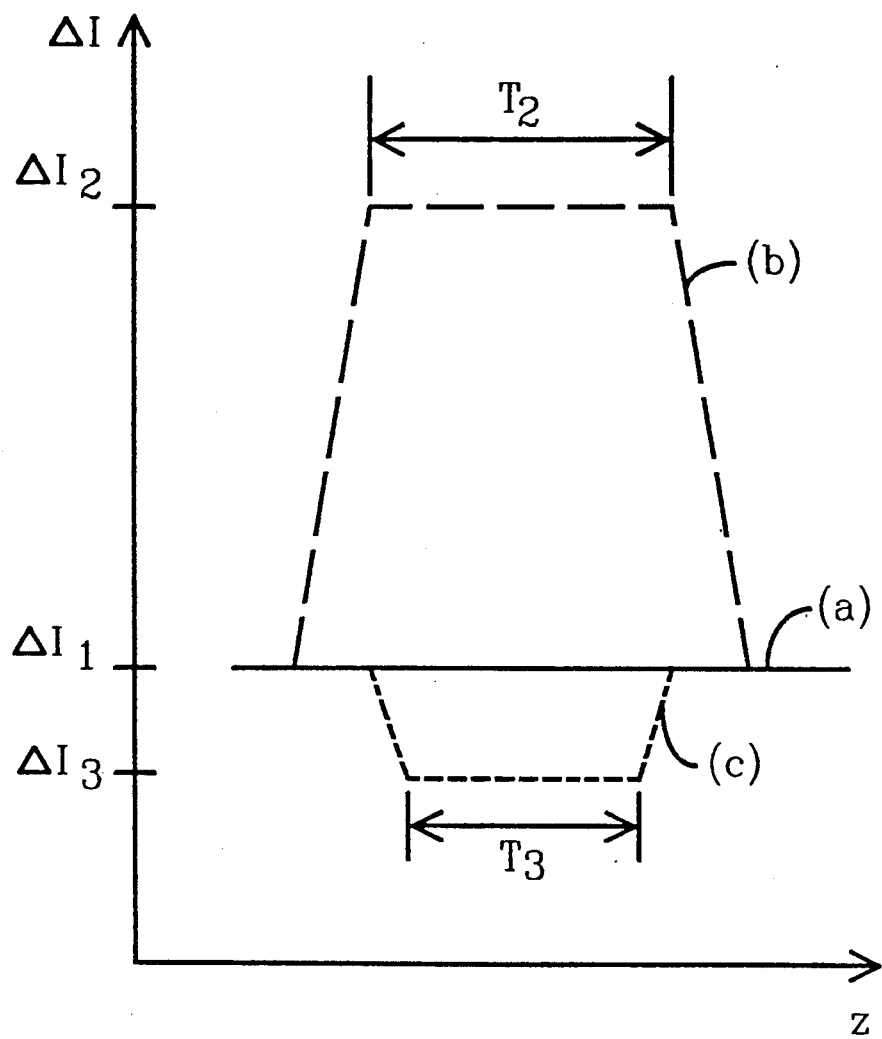
FIG. 2 shows $\Delta I$ vs. $z$ which diagrammatically depicts the response of the tool to different formations.

Therefore, in a preferred method of operation introduced in Ser. No. 07/089,697, first the tool is "balanced" for a null output from amplifier 30 when SW1 is connected to cable 24, and then the departure of the signal from null when SW1 is instead connected to electrode B provides a measure of the leakage current. Quoting further from Ser. No. 07/089,697:

"FIG. 2 shows the differential current conducted into formation $\Delta I$ for different vertical positions z within a steel cased borehole. z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electrical field produces outward flowing currents such as $\Delta I$ in FIG. 1 which are inversely proportional to the resistivity of the formation. Therefore, one may expect discontinuous changes in the current $\Delta I$ at the interface between various resistive zones particularly at oil/water and oil/gas boundaries. For example, curve (a) in FIG. 2 shows the results from a uniform formation with resistivity $\rho_1$. Curve (b) shows departures from curve (a) when a formation of resistivity $\rho_2$ and thickness $T_2$ is intersected where $\rho_2$ is less than $\rho_1$. And curve (c shows the opposite situation where a formation is intersected with resistivity $\rho_3$ which is greater than $\rho_1$ which has a thickness of $T_3$. It is obvious that under these circumstances, $\Delta I_3$ is less than $\Delta I_1$, which is less than $\Delta I_2$.

Figure 3:
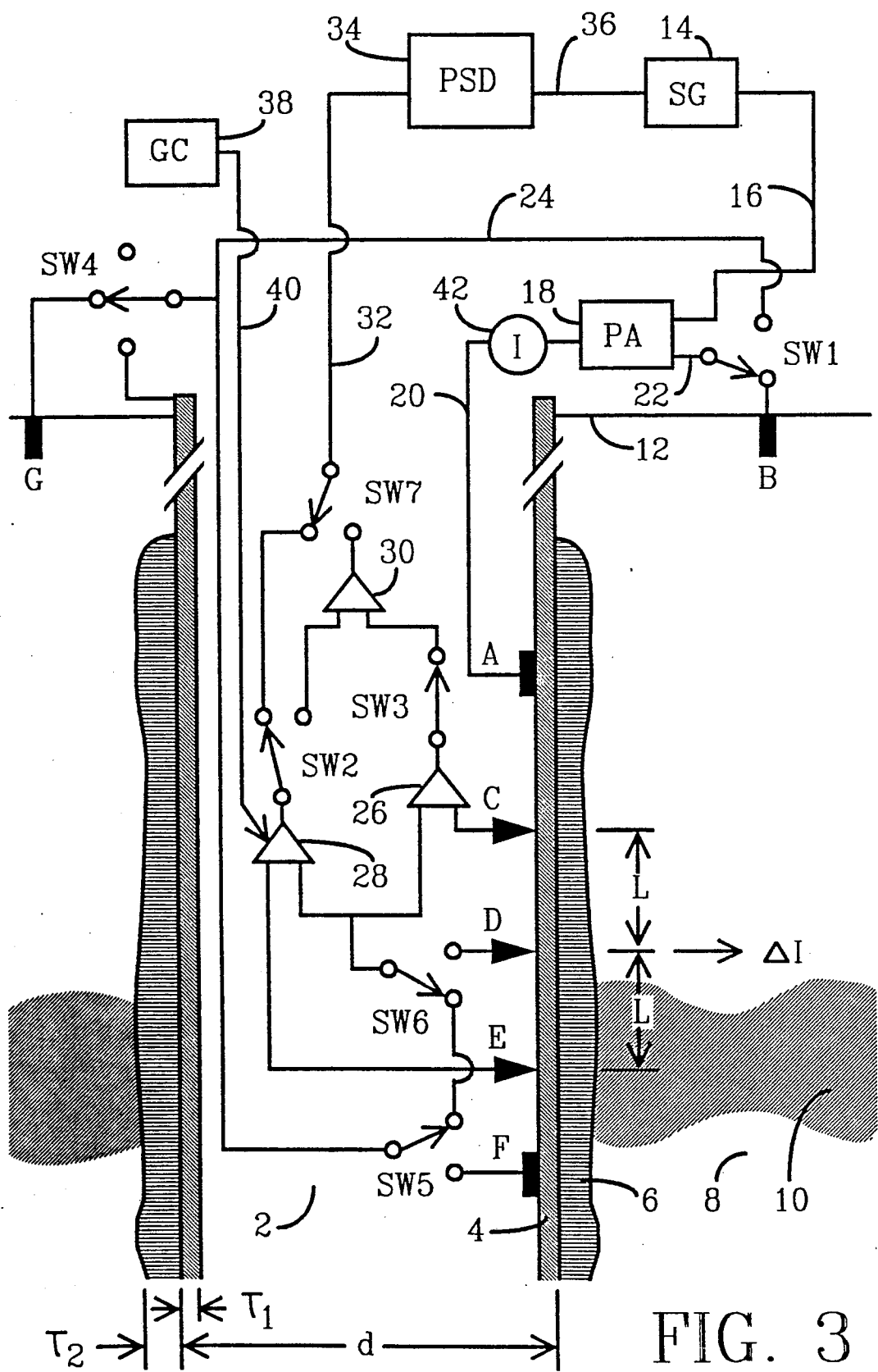
FIG. 3 is a sectional view of a preferred embodiment of the invention which shows how $V_o$ is to be measured.

"FIG. 3 shows a detailed method to measure the parameter Vo. Electrodes A, B, C, D, E, and F have been defined in FIG. 1. All of the numbered elements 2 through 40 have already been defined in FIG. 1. In FIG. 3, the thickness of the casing is $\tau_1$, the thickness of the cement is $\tau_2$, and d is the diameter of the casing. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

"In addition, SW4 is introduced in FIG. 3 which allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.)

"With switches SW2, SW5, SW6, and SW7 operated as shown in FIG. 3, then the quantity Vo may be measured. For a given current I conducted to electrode A, then the casing at that point is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates Vo provided the separation of electrodes A, C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and Vo is measured appropriately with the phase sensitive detector 34. In many cases, SW4 may instead be connected to the top of the casing which will work provided electrode A is beyond a critical depth . . . ".

Quoting further from Ser. No. 07/089,697:

"For the purposes of precise written descriptions of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

"Furthermore, Vo is called the local casing potential. An example of an electronics difference means is the combination of amplifiers 26, 28, and 30. The differential current conducted into the formation to be measured is $\Delta I$."

The differential voltage is that voltage in FIG. 1 which is the output of amplifier 30 with SW1 connected to electrode B and with all the other switches in the positions shown.

Figure 4:
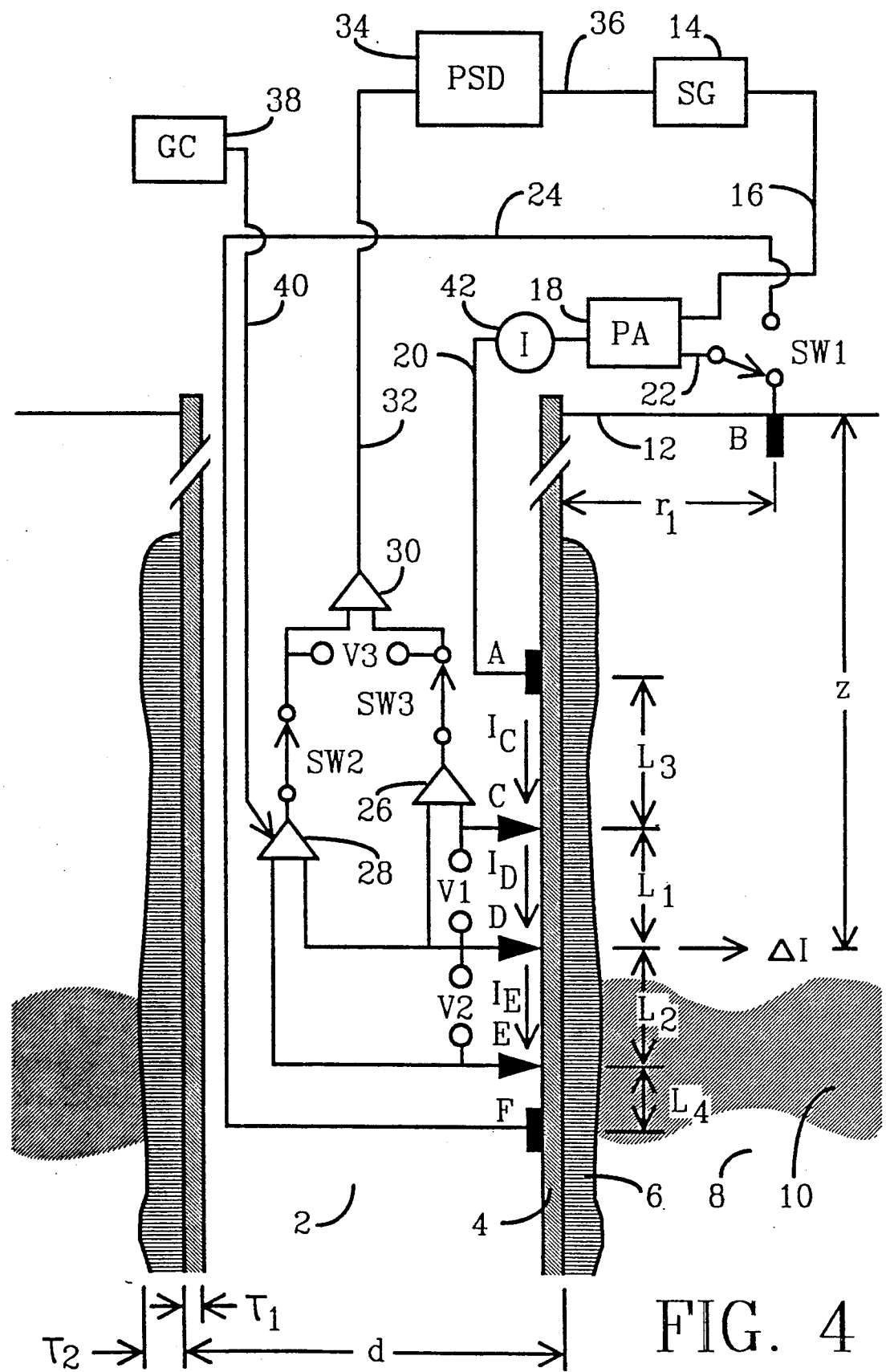
FIG. 4 is a sectional view of an embodiment of the invention which has voltage measurement electrodes which are separated by different distances.
Figure 5:
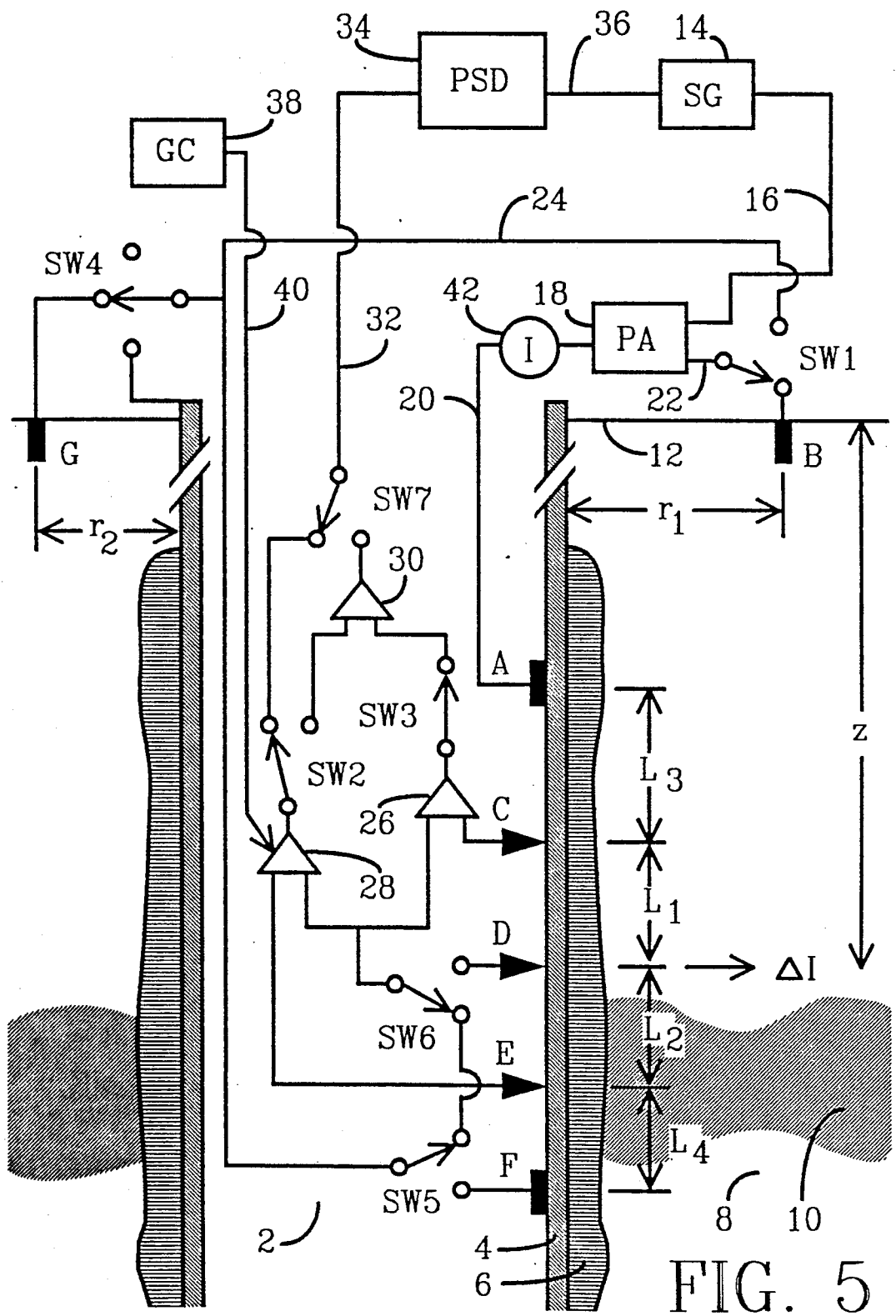
FIG. 5 is a sectional view of an embodiment of the invention which has electrodes which are separated by different distances and which shows explicitly how to measure $V_o$.

Further quoting from Ser. No. 07/089,697:

"FIG. 4 is nearly identical to FIG. 1 except the electrodes C and D are separated by length $L_1$, electrodes D and E are separated by $L_2$, electrodes A and C are separated by $L_3$ and electrodes E and F are separated by the distance $L_4$. In addition, $r_1$ is the radial distance of separation of electrode B from the casing. And z is the depth from the surface of the earth to electrode D. FIG. 5 is nearly identical to FIG. 3 except here too the distances $L_1$, $L_2$, $L_3$, $L_4$, $r_1$, and z are explicitly shown. In addition, $r_2$ is also defined which is the radial distance from the casing to electrode G. As will be shown explicitly in later analysis, the invention will work well if $L_1$ and $L_2$ are not equal. And for many types of measurements, the distances $L_3$ and $L_4$ are not very important provided that they are not much larger in magnitude than $L_1$ and $L_2$."

Figure 6:
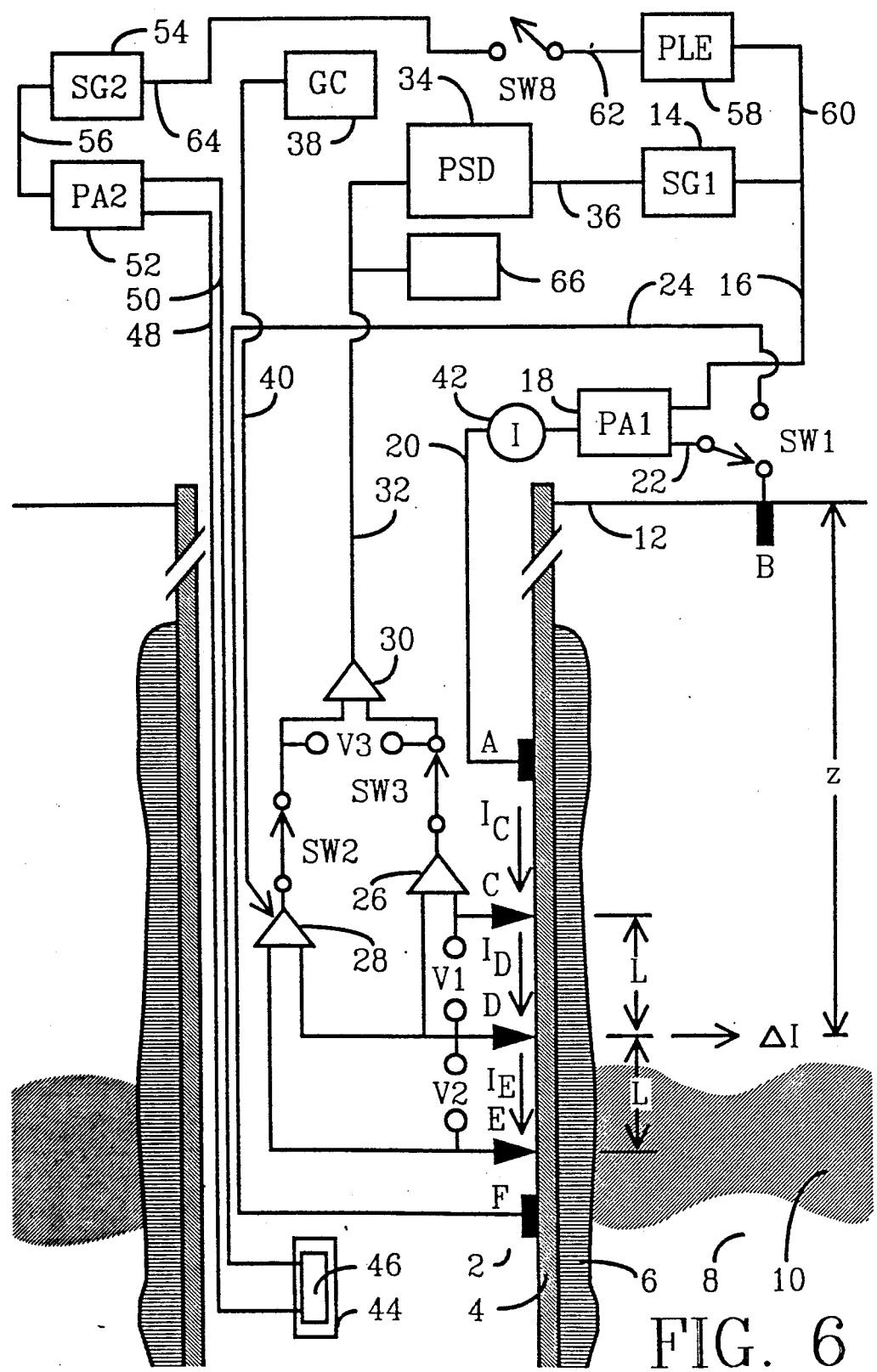
FIG. 6 is a sectional view of an embodiment of the invention which is adapted to measure electrochemical properties while simultaneously subjecting the casing and the formation to acoustic energy.

FIG. 6 is a sectional view of an embodiment of the invention which is adapted to measure electrochemical properties while simultaneously subjecting the formation to acoustic energy. All the elements except those numbered 14, 18, and 44 thru 66 have already been defined in FIGS. 1, 3, 4, and 5. Element 14 is still a signal generator, but it has been relabeled from "SG" to "SG1" in FIG. 6 since there is now a second signal generator in FIG. 6. Similarly, element 18 is still a power amplifier, but it has been relabeled from "PA" to "PA1" in FIG. 6, since there is now a second power amplifier in FIG. 6. Pressure housing 44 encloses an acoustic energy source 46 that receives power from the surface through cables 48 and 50. The second power amplifier 52 is labeled "PA2", and the output of PA2 supplies power to cables 48 and 50 respectively. The power amplifier PA2 receives its input from cable 56 attached to the output of a second signal generator 54 labeled as SG2 in FIG. 6.

If SG1 and SG2 are operated at the same frequency, Phase Lock Electronics 58 labeled as PLE receives its reference input from SG1 through cable 60. The output of the PLE proceeds through cable 62 to switch SW8, and from SW8 to the phase lock input of signal generator SG2 via cable 64. Oscilloscope 66 is also now in parallel with the phase sensitive detector 34.

Therefore, the apparatus shown in FIG. 6 can measure electrochemical properties at a first frequency set on SG1. A second frequency set on SG2 can be used to simultaneously drive the acoustic source 44 at that second frequency. The modulation of electrochemical properties at the second frequency can be observed with oscilloscope 66. The phase sensitive detector 34 may also be used to measure the modulation of electrochemical properties at the second frequency. If the first and second frequencies are the same, and if SW8 is closed, then the PSD 34 can be used to measure the amplitude and phase of the acoustically modulated electrochemical properties of the formation.

Figure 7:
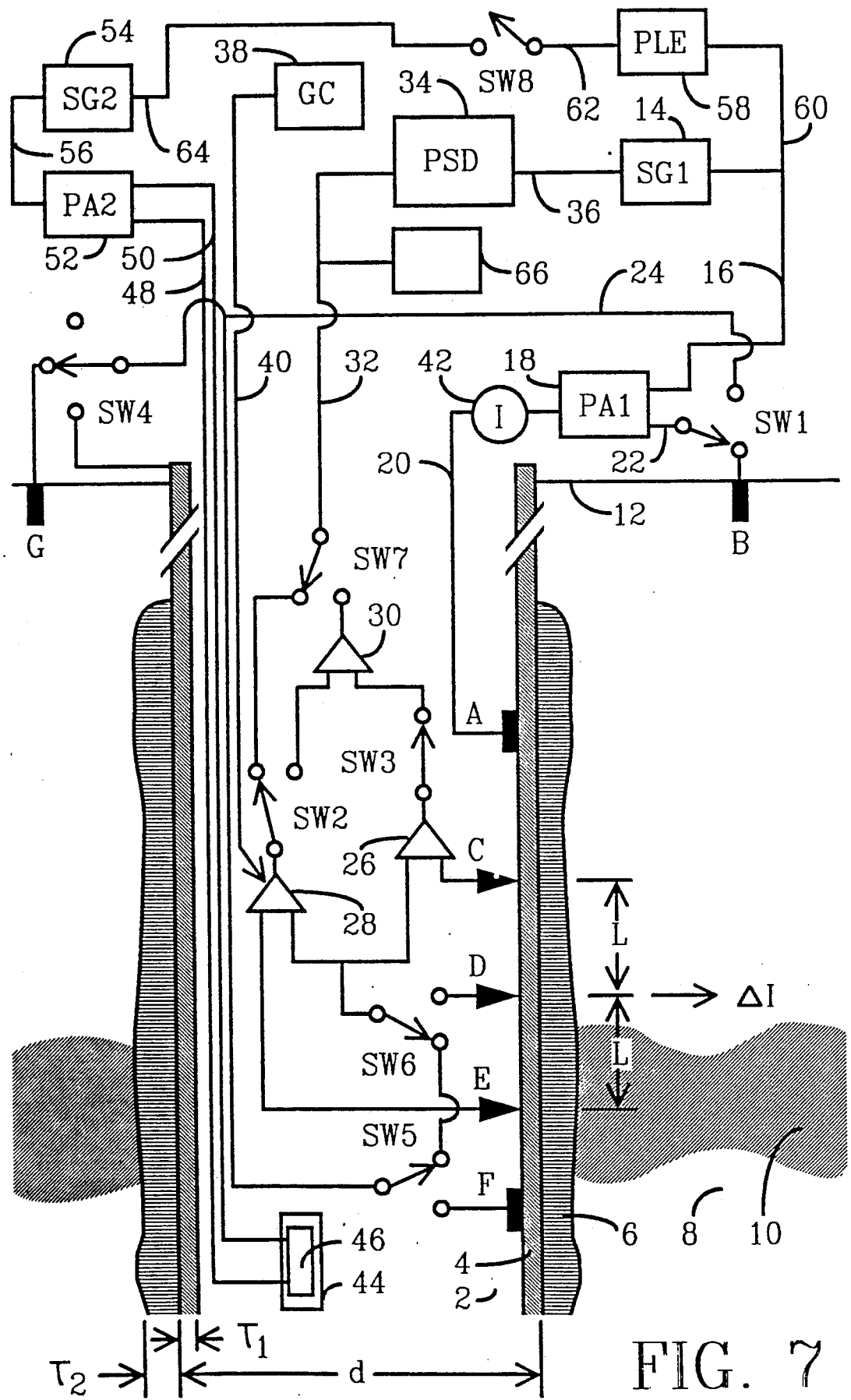
FIG. 7 is a sectional view of an embodiment of the invention which is adapted to measure the potential voltage of the casing while simultaneously subjecting the formation to an acoustic energy source.

FIG. 7 is a sectional view of an embodiment of the invention which is adapted to measure the potential voltage of the casing while simultaneously subjecting the formation to an acoustic energy source. The various elements have already been defined. Analogously, if the first and second frequencies are the same, and if SW8 is closed, then PSD 34 can be used to measure both the amplitude and phase of the acoustically modulated potential voltage of the casing.

Quoting further from Ser. No. 07/089,697 (page 58, lines 23 through page 59, line 9 in the original application):

"And in addition, measurements of the electronic properties of formations through casing may be performed while simultaneously subjecting the formation and the casing to an acoustic energy source. For example, resistivity measurements may be performed thru casing while conducting a current of one frequency through casing. If the acoustic source is energized at another frequency, then the differential current conducted into formation will be modulated at the sum and difference frequencies because the resistivity of the formation will be acoustically modulated. And since the elastic properties of cement and the surrounding geological formation are different, methods based on the acoustic modulation of formation resistivity may be used to determine the presence or absence of cement surrounding the casing. Similarly, measurements of electrochemical phenomena can be performed while simultaneously subjecting the formation to an acoustic source. Convenient acoustic sources inside casing are piezoelectric crystals and any type acoustic source may be used outside the casing on the surface of the earth or in another borehole."

Therefore, this invention discloses a preferred method of operation wherein: (a) resistivity measurements are performed from within the casing while (b) acoustic energy from any source located anywhere modulates the resistivity measurements. Such acoustically modulated geophysical measurements are useful for locating bypassed oil and gas; reservoir evaluation; monitoring water floods; measuring quantitative saturations; cement evaluation; for permeability measurements; and for measurements through a drill string when the drilling bit is stopped. It is reasonable to expect that such measurements will be useful for measuring fractures in formation. Furthermore, since the acoustic properties of the rocks depend upon the adjacent formation pressure at depth, then it is also reasonable to expect that such measurements may be used to infer the natural ambient static fluid pressure in formation adjacent to the cased well.

Figure 8:
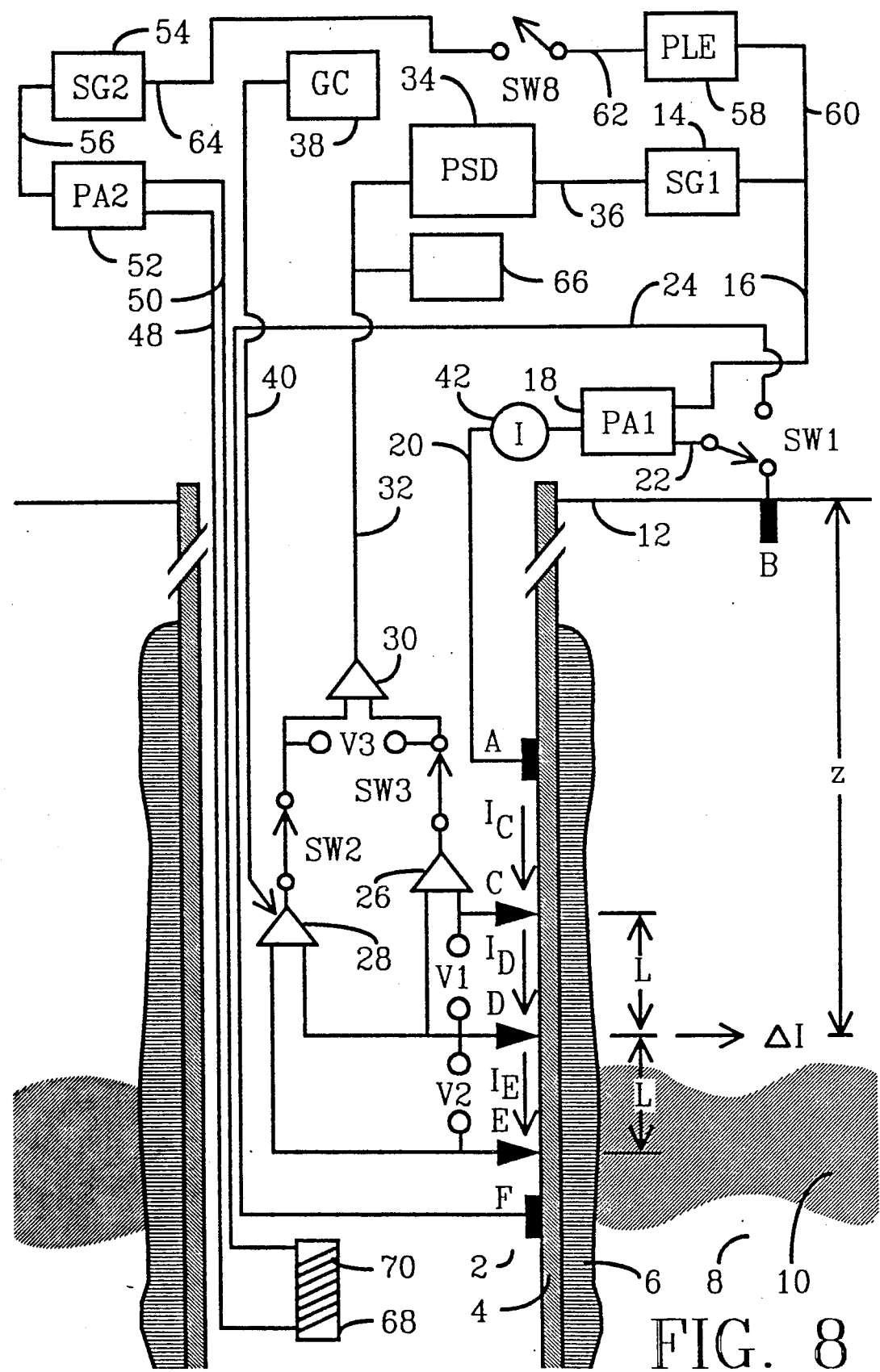
FIG. 8 is a sectional view of an embodiment of the invention which is adapted to measure electrochemical properties while simultaneously subjecting the casing and the formation to an applied magnetic field.
Figure 9:
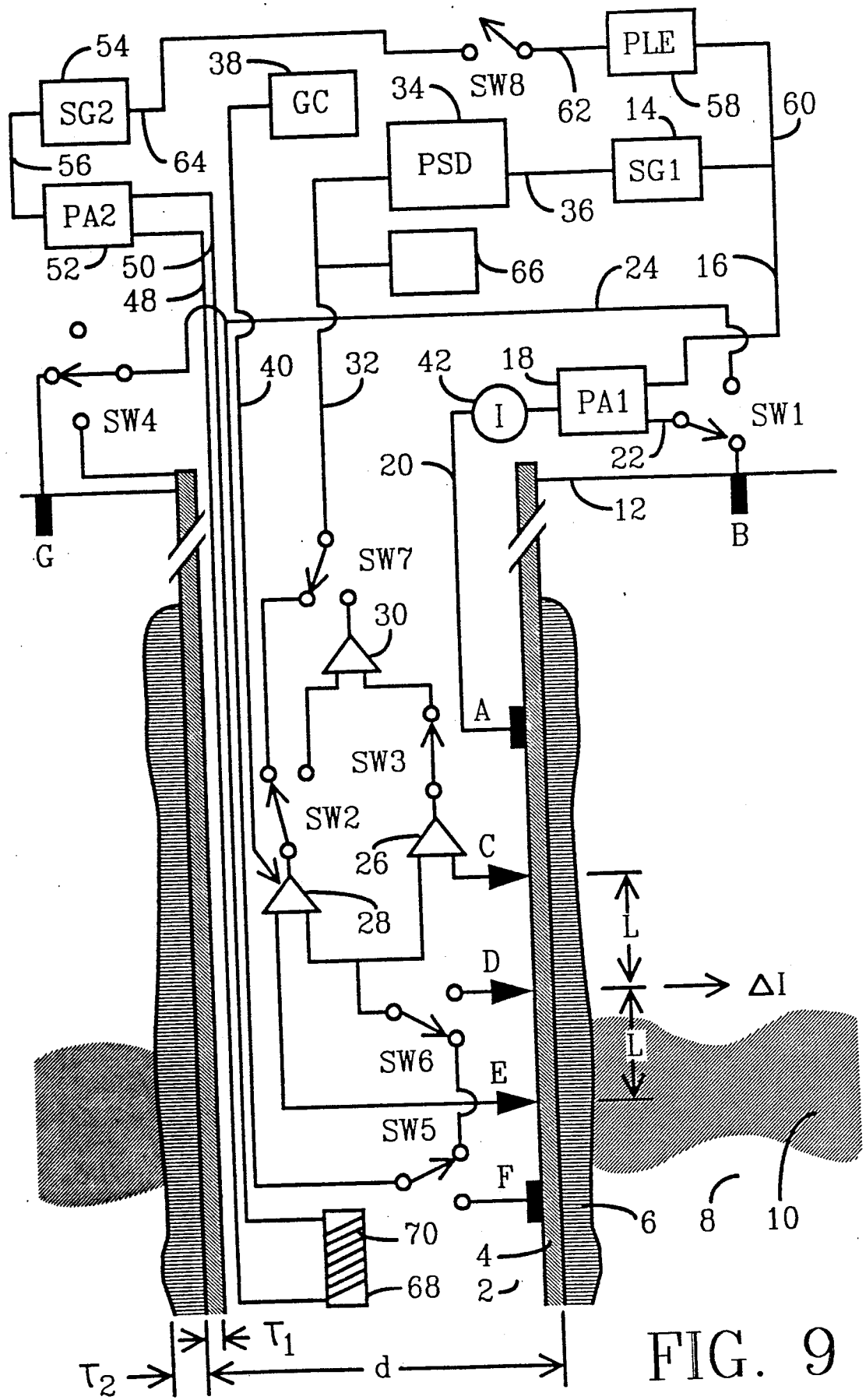
FIG. 9 is a sectional view of an embodiment of the invention which is adapted to measure the potential voltage of the casing while simultaneously subjecting the formation to an applied magnetic field.

Another totally independent invention describes measurements of resistivity while subjecting the formation and the casing to an applied magnetic field. FIG. 8 is a sectional view of an embodiment of the invention which is adapted to measure electrochemical properties while simultaneously subjecting the casing and the formation to an applied magnetic field. FIG. 9 is a sectional view of an embodiment of the invention which is adapted to measure the potential voltage of the casing while simultaneously subjecting the formation to an applied magnetic field. All the elements in both of these figures have been defined except elements 68 and 70. In FIGS. 8 and 9, element 68 is a high permeability magnetic material such as an iron rod with windings of insulated wire 70 wrapped around that high permeability magnetic material. Power is supplied by SG2 and PA2 through cables 48 and 50 in an analogous fashion described in FIGS. 6 and 7.

Quoting further from Ser. No. 07/089,697 (on page 58 lines 6–15 of the original application):

"In addition, magnetic fields on the inside of the casing can be used to adjust the magnetic permeability of the casing material. The skin depth of the casing is a function of the magnetic permeability as shown in Eq. 22. Therefore, magnetic means located on the inside of borehole casing or a drill stem can be used to magnetically saturate the steel pipe, which therefore substantially changes the magnetic permeability which in turn changes the effective skin depth. Such effects can also be used to adjust the radius of investigation of the invention in a drill stem, or inside any iron casing which is inside any typical cased well."

Therefore, SG2 can provide a D.C. voltage, and therefore under these circumstances, PA2 provides a D.C. magnetic field applied to the casing, and therefore PSD 34 can be used to measure the amplitude and phase of the response at the frequency set on SG1, provide SW8 is open. Operated in a different manner, SG1 can be set to one frequency, SG2 set to another, and with SW8 open, the results observed on the oscilloscope 66. Or operated in yet a different way, SG1 and SG2 can be operated at the same frequency, and with SW8 closed, PSD 34 therefore measures the amplitude and phase of the response of apparatus to the applied magnetic field. Furthermore, if the applied magnetic field is an A.C. magnetic field, then such a field can cause A.C. currents in both the casing and in the adjacent geological formation which affect the measurement of the leakage current.

It should also be noted that if element 68 were instead a torroidally shaped magnetic material with its axis aligned along the axis of the borheole casing and windings 70 were instead wound around this torroid, that the casing would be subjected to another type of magnetic field. If this were a time varying magnetic field, then currents would be caused to flow in the casing and in the adjacent formation. The leakage current would then be affected by this torroidal field as well.

While the above description contains many specificities, these should not be construed as limitations on the scope of the invention, but rather as exemplification of preferred embodiments thereto. As has been briefly described, there are many possible variations. And despite the fact that much specific and detailed theory has been presented in Ser. No. 07/089,697 as background information which explains the microscopic physical processes which pertain to measuring resistivity, and even if such theory improves in time with later physical investigations and measurements, none-the-less the invention herein provides apparatus and methods to measure the acoustically modulated geophysical properties of the adjacent geological formation through borehole casing independent of the detailed physical processes at work. Accordingly, the scope of the invention should be determined not only by the embodiments illustrated, but by the appended claims and their legal equivalents.

What is claimed is:

1. An apparatus for measuring acoustically modulated electrochemical phenomena of predetermined specific formations adjacent to a borehole casing comprising:

introduction means for selectively applying a time varying measuring current to the casing at a current entry point in the proximity of the specific portion of the formation of interest;

receiving means for receiving at least a portion of the measuring current at a point sufficiently remote from the current entry point to insure that a majority of the current introduced by said introduction means enters the formation from the casing;

voltage measuring means for detecting the time varying voltage level at a multiplicity of at least three spaced apart voltage measuring points along the casing, wherein the disposition of voltage measuring points defines the section of the casing that is adjacent to the specific portion of the formation to be measured;

differential means for simultaneously measuring the magnitudes and the phases of the time varying differential voltages between a plurality of discrete pairs of said voltage measuring points; and acoustic energy generation means for simultaneously subjecting said predetermined specific formations to time varying acoustic energy while measuring the magnitudes and phases of said time varying differential voltages to provide information about the specific formation of interest.

2. An apparatus for measuring acoustically modulated electrochemical phenomena of predetermined specific formations adjacent to a borehole casing comprising:

introduction means for selectively applying a time varying measuring current to the casing at a current entry point in the proximity of the specific portion of the formation of interest;

receiving means for receiving at least a portion of the measuring current at a point sufficiently remote from the current entry point to insure that a majority of the current introduced by said introduction means enters the formation from the casing;

voltage measuring means for detecting the time varying voltage level at a multiplicity of at least two spaced apart voltage measuring points along the casing, wherein the disposition of voltage measuring points defines the section of the casing that is adjacent to the specific portion of the formation to be measured;

differential means for simultaneously measuring the time varying differential voltages between at least two of said voltage measuring points; and acoustic energy generation means for simultaneously subjecting said predetermined specific formations to time varying acoustic energy while measuring the magnitudes and phases of said time varying differential voltages to provide information about the specific formation of interest.

3. An apparatus for measuring the magnetically modulated properties of a section of casing and the magnetically modulated electrochemical phenomena of predetermined specific formations adjacent to the particular section of borehole casing comprising:

introduction means for selectively applying a time varying measuring current to the casing at a current entry point in the proximity of the specific portion of the formation of interest;

receiving means for receiving at least a portion of the measuring current at a point sufficiently remote from the current entry point to insure that a majority of the current introduced by said introduction means enters the formation from the casing;

voltage measuring means for detecting the time varying voltage level at a multiplicity of at least three spaced apart voltage measuring points along the casing, wherein the disposition of voltage measuring points defines the section of the casing that is adjacent to the specific portion of the formation to be measured;

differential means for simultaneously measuring the magnitudes and the phases of the time varying differential voltages between a plurality of discrete pairs of said voltage measuring points; and magnetic field generation means for simultaneously subjecting said predetermined specific formations and the particular section of casing to an applied magnetic field while measuring the magnitudes and phases of said time varying differential voltages to provide information about the specific formation and particular section of casing of interest.

4. An apparatus for measuring the magnetically modulated properties of a section of casing and the magnetically modulated electrochemical phenomena of predetermined specific formations adjacent to the particular section of borehole casing comprising:

introduction means for selectively applying a time varying measuring current to the casing at a current entry point in the proximity of the specific portion of the formation of interest;

receiving means for receiving at least a portion of the measuring current at a point sufficiently remote from the current entry point to insure that a majority of the current introduced by said introduction means enters the formation from the casing;

voltage measuring means for detecting the time varying voltage levels at a multiplicity of at least two spaced apart voltage measuring points along the casing, wherein the disposition of voltage measuring points defines the section of the casing that is adjacent to the specific portion of the formation to be measured;

differential means for simultaneously measuring the time varying differential voltages between at least two of said voltage measuring points; and magnetic field generation means for simultaneously subjecting said predetermined specific formations and the particular section of casing to an applied magnetic field while measuring said time varying differential voltages to provide information about the specific formation and particular section of casing of interest.

5. A method for measuring the acoustically modulated electronic properties of formations penetrated by a borehole from within a metallic pipe which is positioned within said borehole comprising the steps of:

applying a time varying electric field to the exterior of the metallic pipe such that said electric field has at least a component which is perpendicular to the metallic pipe thereby causing a time varying leakage current to be conducted from the metallic pipe into the formation;

measuring the amplitude and phase of the portion of the leakage current conducted into the formation from a predetermined section of the metallic pipe; and simultaneously applying acoustic energy to predetermined section of the metallic pipe to determine acoustically modulated electronic properties of the formations adjacent the predetermined section of pipe.

6. A method for measuring the magnetically modulated properties of a section of casing and the magnetically modulated electronic properties of formations penetrated by a borehole from within a metallic pipe which is positioned within said borehole comprising the steps of:

applying a time varying electric field to the exterior of the metallic pipe such that said electric field has at least a component which is perpendicular to the metallic pipe thereby causing a time varying leakage current to be conducted from the metallic pipe into the formation;

measuring the amplitude and phase of the portion of the leakage current conducted into the formation from a predetermined section of the metallic pipe; and simultaneously subjecting said predetermined section of metallic pipe to an applied magnetic field to determine the magnetically modulated electronic properties of the formations and of the pipe adjacent the predetermined section of pipe.

7. A method, as claimed in claim 5, wherein the method for measuring the acoustically modulated electronic properties of formations provides information at least partially responsive to the elastic properties of any cement present and to the elastic properties of the surrounding geological formation.

8. A method as claimed in claim 7, wherein any difference in the elastic properties of the cement and of the surrounding geological formation are used to separately identify and separately measure the elastic properties of any cement present to determine the presence or absence of cement surrounding the casing and for the purpose of cement evaluation.

9. A method as claimed in claim 7, wherein any difference in the elastic properties of the cement and of the surrounding geological formation are used to separately identify and separately measure the elastic properties of the surrounding geological formation.

10. A method as claimed in claim 9, wherein said elastic properties of the surrounding geological formation are used at least partially to infer information about the adjacent formation pressure.

11. A method as claimed in claim 5, wherein the acoustically modulated electronic properties of formations are used to provide information at least partially responsive to any oil, gas, or water present.

12. A method as claimed in claim 5, wherein the acoustically modulated electronic properties of formations are used to provide information at least partially responsive to the permeability of the geological formation.

13. A method as claimed in claim 6, wherein the magnetically modulated properties of a section of casing and the magnetically modulated electronic properties of formations are used to at least partially infer the radius of investigation of the leakage current flowing into the formation.

14. A method as claimed in claim 6, wherein the magnetically modulated properties of a section of casing and the magnetically modulated electronic properties of formations are used to at least partially infer the effective skin depth of the casing adjacent the formation of interest.

* * * * *